United States Patent [19]

Fiala et al.

[11] Patent Number: 4,541,595

[45] Date of Patent: Sep. 17, 1985

[54] REMOVABLE INTERIOR WINDOW UNIT FOR AIRCRAFT

[75] Inventors: Peter E. Fiala, Federal Way; Gerald E. Davis, Black Diamond; Alan J. Tuma, Edmonds; Jack E. Hart, Bellevue, all of Wash.

[73] Assignee: Heath-Tecna Precision Structures, Kent, Wash.

[21] Appl. No.: 479,674

[22] Filed: Mar. 28, 1983

[51] Int. Cl.[4] .............................................. B64C 1/14
[52] U.S. Cl. .................................. 244/129.3; 292/86; 292/87; 49/463
[58] Field of Search ............... 244/129.3, 129.4, 129.1; 49/463, 465, 61, 62; 292/86, 87; 52/213, 214; 114/173, 174, 176, 177, 178; 296/148, 149

[56] References Cited

U.S. PATENT DOCUMENTS

| | | | |
|---|---|---|---|
| 742,563 | 10/1903 | Beehler | 292/86 |
| 2,575,757 | 11/1951 | Hardy | 244/129.3 |
| 2,722,170 | 11/1955 | Broberg | 49/463 |
| 2,791,007 | 5/1957 | Kobil et al. | 20/36 |
| 2,939,185 | 6/1960 | Ader et al. | 20/11 |
| 3,906,669 | 9/1975 | Vorguitch | 49/372 |
| 3,971,237 | 7/1976 | Rasmussen | 292/87 |
| 4,364,533 | 12/1982 | Pompei et al. | 244/129.3 |

FOREIGN PATENT DOCUMENTS 328678  1/1980  U.S.S.R. ........................... 244/129.3

Primary Examiner—Galen L. Barefoot
Assistant Examiner—Rodney Corl
Attorney, Agent, or Firm—Christensen, O'Connor, Johnson & Kindness

[57] ABSTRACT

In an aircraft having a pressure window mounted in the hull, an interior window assembly is removably mounted in an interior wall spaced from the hull. The interior window assembly is in register with the pressure window to enable occupants of the aircraft to view the outside. The interior wall has an opening formed therein to accept the interior window assembly and the portions of the wall surrounding the opening are biased toward the interior of the aircraft. The interior window assembly includes a windowpane mounted in a frame. The frame includes a flange that overlies the inboard surface of the portions of the wall surrounding the opening, and the bias of the wall portions is exerted on the flange. A constraint means is affixed to the hull of the aircraft and releasably engages the frame to constrain the frame from inboard movement. The bias force of the wall portions and the constraint means cooperate to hold the window in place. Preferably, the interior wall is comprised of stiffly flexible panel members that are flexed upon placement of the window assembly into the opening and tend to return to their unflexed state, thereby exerting the bias force on the flange.

11 Claims, 6 Drawing Figures

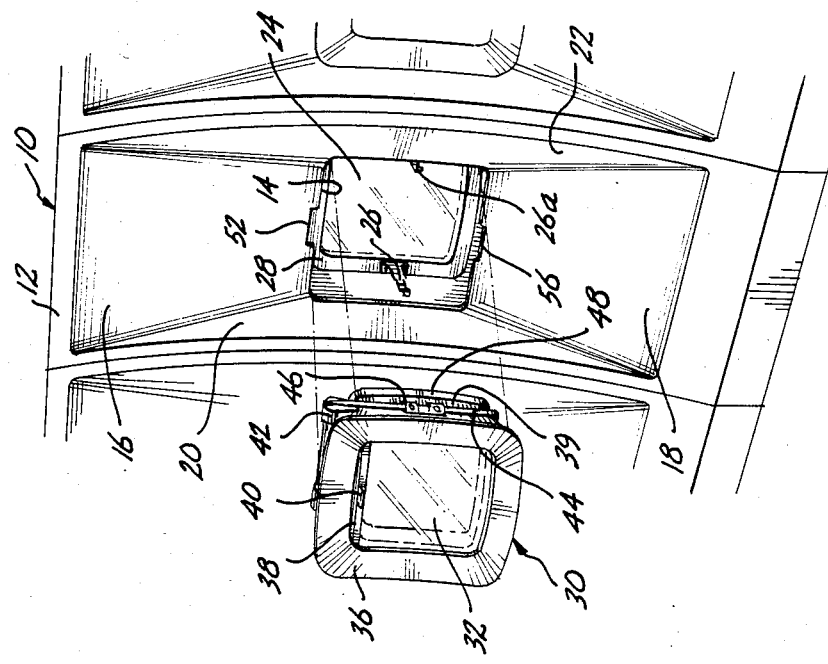
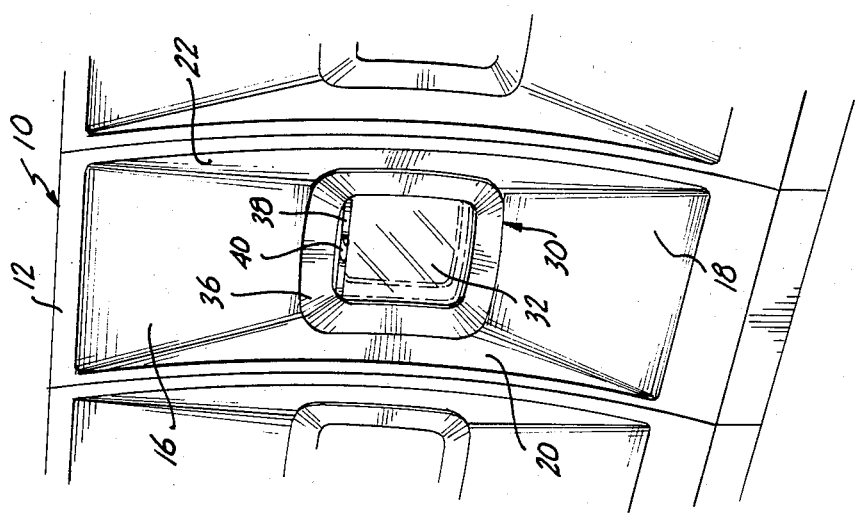

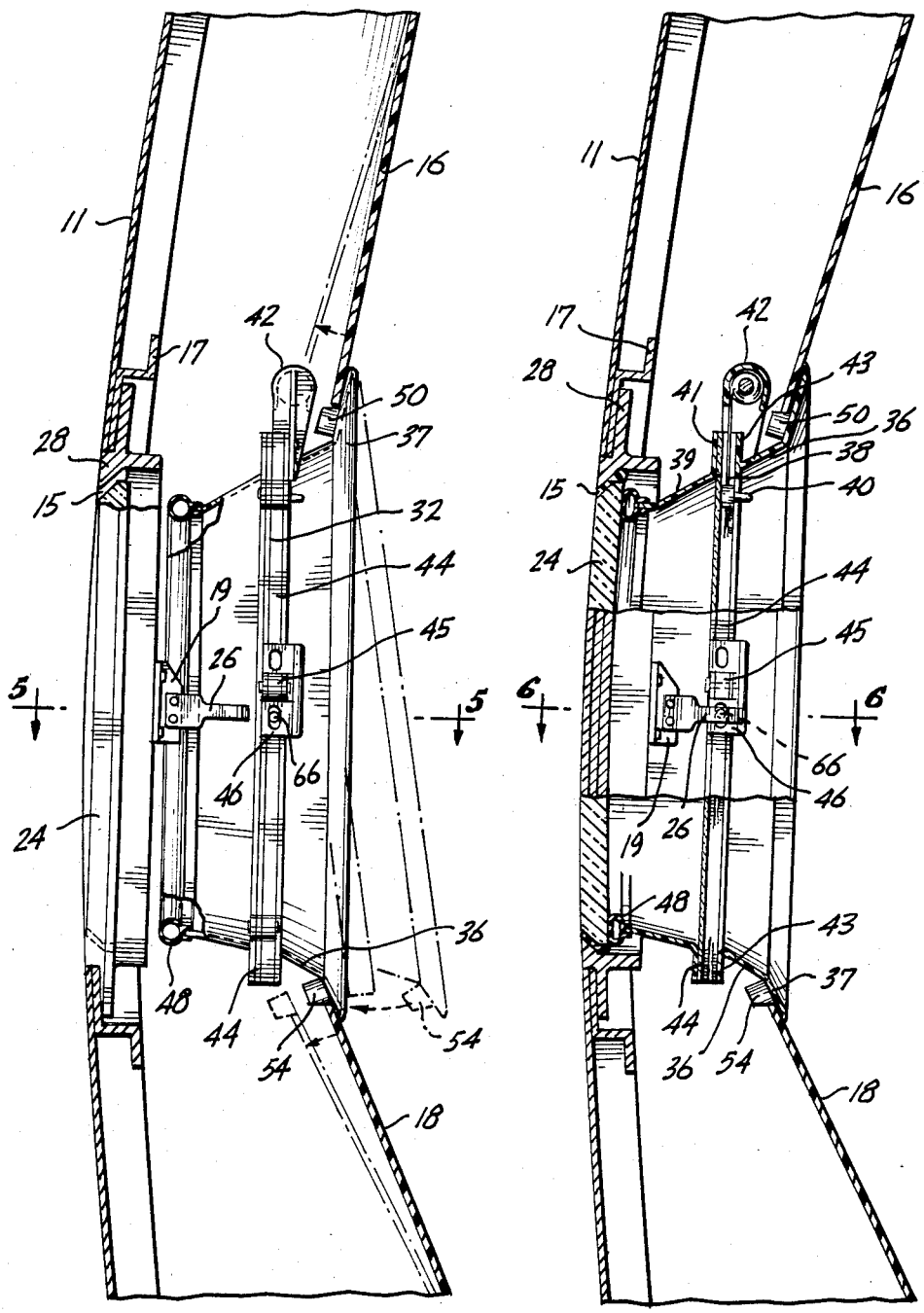

REMOVABLE INTERIOR WINDOW UNIT FOR AIRCRAFT

BACKGROUND OF THE INVENTION

This invention relates to window units for aircraft and in particular relates to a removable interior window unit for use on a passenger aircraft.

Typically, a passenger aircraft will have pressure windows mounted in sealed relation in the fuselage or hull of the aircraft to enable passengers to see out of the aircraft. An interior wall is generally installed spaced from the exterior hull to provide a more pleasing appearance for the interior of the aircraft and also to provide space for various service cables and conduits to run along the length of the aircraft. It is necessary, therefore, to make openings in the interior walls at the locations of the pressure windows to enable the passengers to see through the interior wall and out of the pressure window. In order to prevent passengers from marring or having access to the pressure window, an interior window is generally mounted in the interior wall paneling.

Conventional interior windows for aircraft generally include a transparent windowpane mounted in a frame or reveal. The reveal is then fixedly mounted to the interior paneling prior to the installation of the interior paneling in the aircraft. A slidable shade is generally provided inboard of the windowpane to enable a passenger to block sunlight coming through the window. If the shade or interior window is marred or damaged or if they or the pressure window need to be replaced or maintained, the conventional construction of the interior windows means that the entire interior panel must be removed and sent to a maintenance shop for repair. In order to remove the entire panel, it is necessary to remove the seats in the aircraft adjacent the panel. Therefore, interior window, window shade and pressure window repair or replacement is a major maintenance task.

It is therefore an object of the present invention to provide an interior window assembly that is more readily removable from the interior paneling of an aircraft.

It is further an object of the invention to provide a window unit that is removable separately from the interior paneling and that can therefore be installed and removed without removing any of the aircraft seats.

SUMMARY OF THE INVENTION

In order to fulfill the objects listed above, an interior window assembly for passenger aircraft is provided that includes a windowpane surrounded by a rigid frame. The frame is adapted to be inserted into an opening in a stiffly flexible interior wall panel of an aircraft so that the window frame is in register with an exterior pressure window mounted in the hull of the aircraft. The panel portions surrounding the opening in the interior wall are biased inboard, and the window frame includes a flange that is releasably engaged by spring arms extending from the hull of the aircraft in an inboard direction. The window is held in place by the wall panel surrounding the frame that applies an inboard force to the window frame and resulting in tension on the spring arms, thus holding the window frame assembly relatively immovable.

The window assembly is removable from the interior of the aircraft by exerting a lateral force on the spring arms through inconspicuous openings in the window frame which moves the spring arms out of engagement with the flanges. The window assembly is therefore completely installable and removable from the interior of the aircraft and does not require the removal of the interior paneling. A seal is provided around the window assembly outboard surface which interfaces with the exterior hull pressure window to provide a seal to the interior space between the interior window and the pressure window. Keeper members provided on the window assembly cooperate with mating details on the panel opening to provide installation alignment and to restrict lateral motion.

BRIEF DESCRIPTION OF THE DRAWINGS

The objects and advantages of the present invention will be better understood by those of ordinary skill in the art and others upon reading the ensuing specification taken in conjunction with the appended drawings wherein:

FIG. 1 is an isometric view of an interior panel of a passenger aircraft having an interior window assembly made in accordance with the principles of the present invention mounted therein;

FIG. 2 is an isometric view of the window assembly of FIG. 1 removed from the interior panel;

FIG. 3 is a side elevational view in partial section of the window assembly of FIG. 1 prior to being locked in place in the interior panel;

FIG. 4 is a side elevational view in partial section of the window assembly of FIG. 1 fully installed in the interior panel;

DETAILED DESCRIPTION OF THE PREFERRED EMBODIMENT

Figure 6:
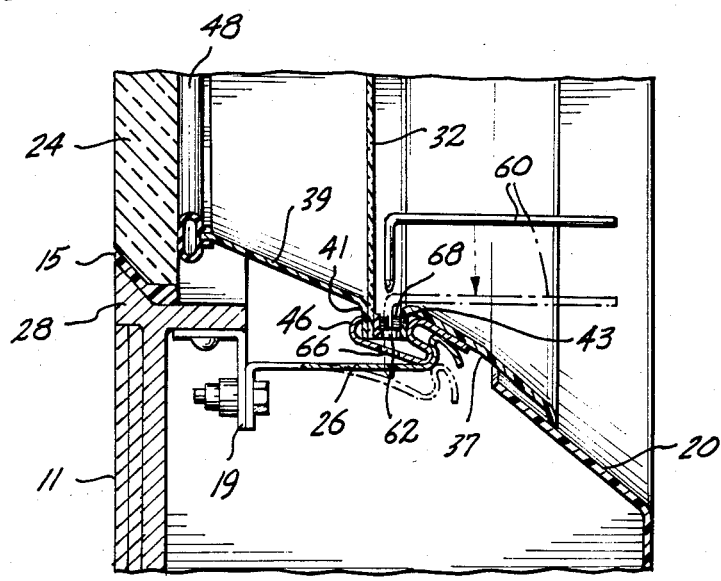
FIG. 6 is a section view taken along the line 6—6 in FIG. 4.

FIG. 1 illustrates one embodiment of a window assembly made in accordance with the principles of the present invention installed in the interior of an aircraft. FIG. 2 illustrates that same window assembly removed from the interior paneling of the aircraft. The interior panel 10 has a peripheral frame 12 of generally rectangular shape. An opening 14 is formed in approximately the center of the panel and is bounded by stiffly flexible, planar panel portions 16, 18, 20, and 22 that extend respectively from the peripheral frame 12 to the boundary of the opening 14. The interior panel 10 is spaced from the outer hull of the aircraft and, as shown in FIG. 2, the pressure window 24 mounted in the hull of the aircraft is visible. First and second spring arms 26 and 26a extend from the forward and aft edges of the pressure window frame 28 inwardly toward the interior panel 10. The spring arms are used to assist in holding an interior window assembly 30 of the present invention in place within the opening 14 as will be described in greater detail below. Other types of latching or constraint means can be employed in place of the spring arms.

The window assembly 30 includes a transparent windowpane 32 typically made of a transparent plastic material, such as plexiglass. The pane 32 is secured in position between an outer reveal 39 and a frame 44. The outer reveal has open ends and is of a width substantially equal to the distance between the interior panel 10 and the outer hull pressure window 24. An inboard reveal 36 is shaped to form a retaining flange 37 as it extends inboard, the retaining flange 37 being somewhat larger than the opening 14. As can be seen in FIG. 1, when the window assembly 30 is in place, the flange 37 overlies the portions of the wall panels 16, 18, 20 and 22 immediately surrounding the opening 14. The flange 37 is formed to approximately the same contour as the stiffly flexible panels 16, 18, 20, and 22 so that the window assembly fits smoothly with the interior panel upon installation.

Typically, the window assembly 30 will include a roll-up shade 38 that is slidable to cover the pane 32 to block sunlight coming into the cabin. The shade 38 includes a handle portion 40 that acts both as a means to allow the passenger to operate the shade and to prevent the shade from rolling completely out of reach of the passenger into the shade housing 42 that is mounted at the top of the window frame 44.

Referring to FIG. 3, the installation of the window assembly 30 is shown in greater detail. The pressure window 24 can be seen installed in the hull 11 of the aircraft. The pressure window is of conventional design and is surrounded by a pressure window frame assembly 28. A sealing member 15 is interposed between the frame assembly 28 and the window. The frame 28 is mounted to stringers 17 that form a part of the hull 11. Each of the spring arms 26 is bolted to a spring arm bracket 19 attached by machine screws or rivets to the frame assembly 28. The inboard end of the outer reveal 39 has an outwardly extending flange 41 formed thereon that is adjacent the frame 44. The pane 32 is interposed between the flange 41 of the frame 44. An outboard flange 43 on the inboard reveal 36 abuts the inboard side of the frame 44. The inboard reveal 36, frame 44, pane 32 and outboard reveal 36 are held together by machine screws 45 and cooperating nuts. A metal clip member 46 is mounted on the assembled flanges 41 and 43 to cooperate with the spring arm 26, as will be discussed below. A similar metal clip member 46 is mounted on the assembled flanges 41 and 43 on the opposite side of the frame 44 to coact with the spring arm 26a located on the opposite side of the pressure window. A seal member 48 is affixed to the outboard end of the outer reveal 39 and is deformed into a sealing relation between the outer reveal and the pressure window 24 when the window assembly 30 is in its installed and secured position.

An upper keeper block 50 is affixed to the outboard surface of the upper side of the flange 37 and is positioned at approximately the center of the upper edge in the fore/aft direction. The keeper block 50 is aligned with a notch 52 formed in an upper edge of the window cutout 14. A similar lower keeper block 54 is mounted on the outboard surface of the lower side of the flange 37 aligned with a second notch 56 formed in a lower edge of the cutout 14. The keeper blocks restrain both the fore/aft and vertical movement of the window assembly 30 when it is installed.

FIG. 3 shows a sequence of installation of the window assembly 30. The upper keeper block 50 and the lower keeper block 54 are in register with the notches 52 and 56 to index the window assembly in position within the opening 14. The width of the outer reveal 39 in the outboard direction is such that with the panel portions 16, 18, 20, and 22 in their relaxed state, the seal member 48 does not meet the pressure window 24 and the metal clip members 46 do not engage the spring arms 26 and 26a. It is necessary for the installer to force the window assembly outboard and flex the panel portions 16, 18, 20, and 22 in an outboard direction in order to engage the spring arms 26 and 26a with the metal clip members 46 and to deform the seal member 48 against the pressure window 24 to form a sealing fit for the seal member 48. The flex of the panel portions 16 and 18 is shown in the phantom line of FIG. 3. Once the outboard force exerted by the installer on the window assembly 30 is released, the inherent bias of the panel portions 16, 18, 20, and 22 will tend to straighten those panel portions to their original unflexed position. This biasing force on the window assembly 30 has both inboard and radial components that hold the window assembly captive in the opening 14. The spring clip arms 26 and 26a on either side of the window assembly are hooked over the assembled flanges 41 and 43 and resist inboard movement of the window assembly. The coaction between the force exerted by the wall panels and the resistance of the spring clip arms to inboard movement serves to hold the window assembly 30 firmly in the cutout 14.

Figure 5:
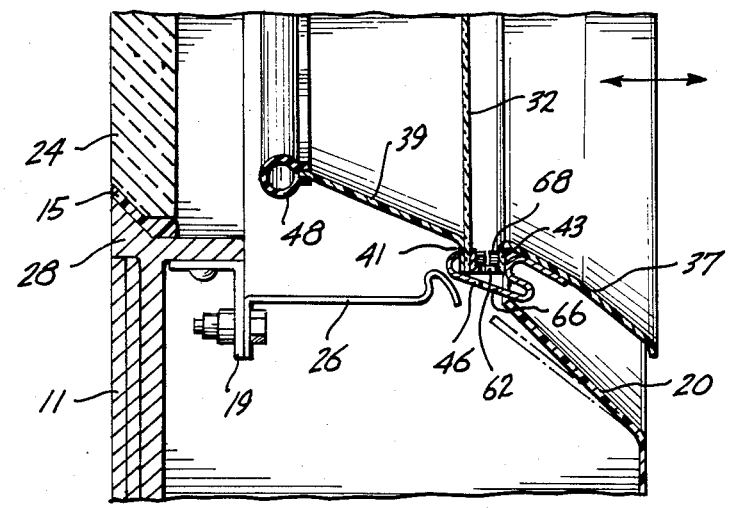
FIG. 5 is a section view along line 5—5 of FIG. 3.

Referring to FIGS. 5 and 6, the configuration of the spring arms 26 and 26a can be seen as having a hook portion that engages the assembled flanges 41 and 43 and resists inboard movement of the window assembly. When it is desired to remove the window assembly 30, it is necessary to disengage the spring arms from the respective metal clip members and flanges. The operator first must exert a force outboard on the window assembly to flex the panels 16, 18, 20 and 22. The window assembly is thereby moved outboard, compressing seal 48 and releasing the hooked end of the spring arms 26 from the flanges 41 and 43. A removal tool 60 is insertable into a hole 62 formed in a shade channel 64. The hole 62 is in register with a trip hole 66 formed in the metal clip member 46. When the tool 60 is inserted through the holes in the shade channel 64, the tip of the removal tool contacts the spring arm 26. With the window assembly moved outboard to release the hook ends of the spring arms, the operator can move the spring arm away from the clip member 46, preventing further engagement of the spring arm with the flanges 41 and 43, and thereby permitting inboard movement of the window assembly. The window assembly can then be withdrawn from the opening 14. The release position of the removal tool is shown in phantom line in FIG. 6. Preferably, the shade channel 64 is lined with opposing nylon brush members 68 that provide a low-friction gasket to aid in the ease of movement of the shade up and down and also prevent rattling of the shade when it is in the closed position covering the pane 32. Preferably, the holes formed in the shade guide channel are relatively small in diameter and are effectively hidden by the nylon gasketing to prevent curious passengers from poking implements into the holes and accidently releasing the spring arms 26 and 26a. Identical holes are formed in the shade channel on each of the forward and aft sides of the frame adjacent each of the spring arms 26 and 26a.

The spring arms 26 are presently utilized on certain commercial aircraft as one of the means of holding the interior wall panels in position. Therefore, the window assembly 30 could be easily utilized on those existing aircraft as a retrofit item without any major modification to the exterior hull or pressure window assemblies. It will be understood by those of ordinary skill in the art and others that while a preferred embodiment of the present invention has been described and illustrated, several changes could be made to the illustrated embodiment while remaining within the spirit and scope of the present invention. As was mentioned earlier, the spring arms illustrated are of the type presently used on commercial aircraft, for example, the Boeing 747. The illustrated embodiment is therefore the preferred embodiment for that aircraft since it requires less change to the existing structure to implement the present invention. However, if desired, other designs of spring arms can be used as long as they perform the function of restraining inboard movement of the window assembly and are accessible for release from the interior of the aircraft in the manner described. Further, while the general window shape pictured is that typically used in aircraft today, other window shapes are possible. Therefore, the invention should be defined solely by reference to the claims herein.

The embodiments of the invention in which an exclusive property or privilege is claimed are defined as follows:

1. In an aircraft having a pressure window mounted in the hull, an interior window assembly comprising
   an interior wall panel mounted within the aircraft, and spaced from said hull, said interior wall panel having a window opening formed therein in register with said pressure window, the portions of said wall panel surrounding said window opening being biased in an inboard direction;
   a rigid windowpane mounted in a frame, said frame being of substantially the same size as said window opening;
   a first flange extending from an inboard end of said frame, said first flange being of a dimension larger than the window opening such that portions of said wall surrounding said window opening abut said first flange; and,
   frame constraint means affixed to said hull adjacent said pressure window and removably engaging said window frame to resist movement of said frame in an inboard direction.

2. In an aircraft having a pressure window mounted in the hull, an interior window assembly comprising:
   an interior wall panel mounted within the aircraft and spaced from said hull, said interior wall panel havng a window opening formed therein in register with said pressure window, the portions of said wall panel surrounding said window opening being of stiffly flexible sheet members that are flexed upon insertion of said window assembly into said window opening, the internal tendency of said wall panels to return to their unflexed state providing a bias force on said wall panel portions in an inboard direction;
   a rigid windowpane mounted in a frame, said frame being of substantially the same size as said window opening;
   a first flange extending from an inboard end of said frame, said first flange being of a dimension larger than the window opening, such that portions of said wall surrounding said window opening abut said first flange; and,
   frame constraint means affixed to said hull adjacent said pressure window and removably engaging said window frame to resist movement of said frame in an inboard direction.

3. The window assembly of claim 2 wherein at least one notch is formed in the wall portion adjacent said window opening and further including at least one keeper block affixed to said first flange substantially coextensive in a fore/aft direction with said notch and engaged with said notch to constrain movement of said window assembly in the fore/aft direction.

4. The window assembly of claim 2 wherein a first notch is formed in the wall portion adjacent an upper edge of the window opening and a second notch is formed in the wall portion adjacent a lower edge of the window opening, said window assembly including first and second keeper blocks affixed to said first flange, said keeper blocks being substantially coextensive in the fore/aft direction with said first and second notches and engaged with said notches to limit fore/aft movement of said window assembly, said keeper blocks abutting the respective upper and lower edges of said wall portions adjacent said window opening to limit vertical movement of said window assembly.

5. In an aircraft having a pressure window mounted in the hull, an interior window assembly comprising an interior wall panel mounted within the aircraft, and spaced from said hull, said interior wall panel having a window opening formed therein in register with said pressure window, the portions of said wall panel surrounding said window opening being biased in an inboard direction;
   a rigid windowpane mounted in a frame, said frame being of substantially the same size as said window opening;
   a first flange extending from an inboard end of said frame, said first flange being of a dimension larger than the window opening such that portions of said wall surrounding said window opening abut said first flange;
   a second flange extending outwardly from said frame positioned within the space between said interior wall and said hull; and
   frame constraint means affixed to said hull adjacent said pressure window and removably engaging said window frame, said frame constraint means including a spring arm having a first end affixed to said hull and a second end of substantially hook shape that releasably engages said second flange to restrain said window frame from inboard movement.

6. The window assembly of claim 5 further including a release opening in said frame adjacent said second flange to permit access to said spring arm from the interior of said aircraft.

7. The window assembly of claim 6 further including a clip member releasably affixed to said second flange in the area of engagement of said spring arm with said second flange, said clip member having a trip hole formed therein in register with said release hole.

8. The window assembly of claim 7 wherein said constraint means further includes a second spring arm having a first end affixed to said hull and a second end releasably engageable with said second flange at a position opposite the area of engagement of said first spring arm with said second flange, a second metal clip member removably attached to said second flange in the area of engagement of said second spring arm with said second flange, a second release hole formed in said frame constructed and arranged to permit access to said spring arm from the interior of said aircraft, and a second trip hole formed in said second spring clip member in register with said second release hole.

9. The window assembly of claim 8 further including a shade mounted on said frame inboard of said windowpane and operable between a position in which it covers said windowpane and a position in which it is contained within said frame, said frame including a guide channel in which said window shade travels, said first and second release holes being formed in said guide channel.

10. In an aircraft having a pressure window mounted in the hull, an interior window assembly comprising:
   an interior wall panel mounted within the aircraft, and spaced from said hull, said interior wall panel having a window opening formed therein in register with said pressure window, the portions of said wall panel surrounding said window opening being biased in an inboard direction;
   a rigid windowpane mounted in a frame, said frame being of substantially the same size as said window opening;
   a first flange extending from an inboard end of said frame, said first flange being of a dimension larger than the window opening such that portions of said wall surrounding said window opening abut said first flange;
   a second flange extending outwardly from said frame positioned within the space between said interior wall and said hull;
   frame constraint means affixed to said hull adjacent said pressure window and removably engaging said window frame to resist movement of said frame in an inboard direction, said frame constraint means including first and second spring arms, each of said spring arms having a first end affixed to said hull and a second end of substantially hook shape that releasably engages said second flange to restrain said frame from inboard movement, said first and second spring arms being spaced from one another and engaging said second flange on opposite sides of said frame, said frame including release openings adjacent said second flange to permit access to each of said spring arms from the interior of said aircraft;
   first and second clip members, each of which is releasably affixed to said second flange in the area of engagement of the respective spring arms with said second flange, each said clip member having a trip hole formed therein in register with its associated release hole; and
   a shade mounted on said frame inboard of said windowpane and operable between a position in which it covers said windowpane and a position in which it is contained within said frame, said frame including a guide channel in which said window shade travels, said first and second release holes being formed in said guide channel.

11. The window assembly of claim 10 wherein said portions of said wall panel surrounding said window opening are comprised of stiffly flexible sheet members that are flexed upon insertion of said window assembly into said window opening and wherein the bias force on said panel portions is the internal tendency of said wall panels to return to their unflexed state.

* * * * *